United States Patent Office 3,148,165
Patented Sept. 8, 1964

3,148,165
REACTION PRODUCT OF SALT OF ACROLEIN TYPE POLYMER AND MONO PRIMARY AMINE
Edward F. Kalafus, Akron, and John E. Carmichael, Cuyahoga Falls, Ohio, assignors to The General Tire & Rubber Company, Akron, Ohio, a corporation of Ohio
No Drawing. Filed May 13, 1959, Ser. No. 812,789
19 Claims. (Cl. 260—29.6)

The present invention is directed to the preparation of reaction products of certain primary amines and a reaction product of an alkyl alpha substituted acrolein polymer and a base, preferably sodium hydroxide.

Reaction products of an alkyl alpha substituted acrolein polymer and a strong base, preferably sodium hydroxide, have been produced in the past in which most of the aldehyde groups are converted to —$CH_2OH$ and —COOH salt groups apparently in alternating positions along the generally linear long chain molecular structure of the acrolein polymer. These products, which may be described as a Cannizzaro type methacrolein reaction product, have been prepared by subjecting a methacrolein polymer or other alkyl alpha substituted acrolein polymer to a base such as sodium hydroxide at a slightly elevated temperature such as a temperature around 90° C. to form a product having unusual properties. The resultant modified polymer product is characterized by pendant hydroxyl and carboxyl salt groups which are apparently spaced along the macro molecule in accordance with the position of original aldehyde groups of the original methacrolein polymer. Depending upon the salt thus formed, a modified polymer product readily dissolves and disassociates in water to serve as a polyelectrolyte.

While certain of these salts, and particularly the alkali metal salts, can be used as soil stabilizers and detergents, their water-thickening ability and their emulsifying properties are generally not good enough for commercial applications where they might be used as emulsifying agents or thickeners in latex base paints or in drilling muds.

It is an object of the present invention to provide a water soluble polymer of a reaction product of an alkyl alpha substituted acrolein product and a strong base such as sodium hydroxide or potassium hydroxide, the water soluble polymer having a much greater water thickening efficiency and a much improved emulsifying property.

It is also an object to provide a water soluble polymer of a reaction product of an alkyl alpha substituted acrolein polymer and a strong base which has greatly improved emulsifying properties.

It has been found that improved reaction products of an alkyl alpha substituted acrolein polymer and a base such as sodium hydroxide can be prepared by reacting the above reaction product with a primary amine having a generally long substantially linear alkyl radical of from about 8 to 20 carbon atoms attached to the amino nitrogen atom. Reaction products of the Cannizzaro type alkyl alpha substituted acrolein polymer reaction product and primary amines having 8 to 20 carbon atoms have greatly improved water thickening ability and excellent emulsifying properties.

When forming an emulsion of an aromatic hydrocarbon solvent, such as benzene, in water using the above reaction products as emulsifying agents, the emulsifying agent comprising an alkali metal salt of a reaction product of a strong base such as sodium hydroxide and an alkyl alpha substituted acrolein polymer such as polymethacrolein should be reacted with a primary amine having at least 8 carbon atoms to obtain some emulsifying properties. While 8 carbon atoms in the alkyl portion of the primary amine provides a definite improvement in the ability of the acrolein polymer to emulsify benzene or other hydrocarbon solvent in water, the hydrocarbon portion or alkyl portion of the primary amine should contain preferably at least 12 carbon atoms and the best results are obtained when from 16 to 20 carbon atoms are present in the generally linear alkyl portion of the primary amine.

It has also been found that the hydrocarbon portion of the primary amine should have at least 8 carbon atoms to provide the resultant reaction product of the primary amine and the Cannizzaro type polymethacrolein reaction product with significant improvement in water thickening ability. Up to as high as 12 carbon atoms in the primary amine provides good water thickening ability in the resultant polymer, while optimum water thickening ability is obtained with a primary amine of 10 carbon atoms. When less than 8 carbon atoms or more than about 12 carbon atoms are present in the hydrocarbon portion of the primary amine, for some reason the water thickening ability is greatly reduced. However, when the Cannizzaro polymethacrolein/primary amine reaction product is used as an emulsifying agent, from about 8 to 20 carbon atoms in the hydrocarbon portion of the monoprimary amine can be used with good results. When used as an emulsifying agent, generally the longer the hydrocarbon chain in the primary amine, the better the emulsifying agent.

Suitable monoprimary amines, in accordance with the present invention, are octyl amine, nonyl amine, decyl amine, dodecyl amine, tetradecyl amine, hexadecyl amine, octadecyl amine and other monoprimary amines having chains of 19 and 20 carbon atoms up to 22 carbon atoms. Mixtures of the above primary amines may also be used. Outsanding primary amine/Cannizzaro type polymethacrolein reaction products can be obtained by using a mixture of n-alkyl amines in which the alkyl groups are octyl, decyl and dodecyl radicals. An excellent mixture of n-alkyl amines is one in which the n-dodecyl amine comprises 95% by weight of the mixture and n-decyl and n-tetradecyl amines comprise about 2 and 3% by weight, respectively, of the mixture.

There are monoprimary amines commercially available which comprise generally from about 89 to 93% by weight, or even more, of primary amines obtained from coconut oil. The hydrocarbon portions of the primary amines derived from coconut oil generally have from about 8 to 18 carbon atoms and generally comprise a mixture of alkyl and hydrocarbon portions having 12, 14, 16 and 18 carbon atoms, since the oil extracted from the kernels of coconuts may be roughly considered to have the following fatty acids (contained as glycerides).

| Fatty Acid | No. of Carbon Atoms | Percent by Weight |
| --- | --- | --- |
| Octoic | 8 | 2 |
| Lauric | 12 | 28 |
| Myristic | 14 | 22 |
| Palmitic | 16 | 12 |
| Oleic | 18 | 23 |
| Linoleic | 18 | 10 |
| Stearic | 18 | 1 |

The primary amine adducts of the polymethacrolein-NaOH reaction products are made, according to the present invention, by reacting preferably equal molar equivalent weights of primary amines and a polymethacrolein reaction product based on the amount of aldehyde groups in the polymethacrolein reaction product or other polyalkyl alpha substituted acrolein reaction product. The primary amine adducts can be prepared simply by heating aqueous solutions of generally 10 to 20 percent solids content of the sodium salt of the reaction product of polymethacrolein and sodium hydroxide (hereinafter sometimes designated as NaCPMA-sodium salt of the Cannizzaro reaction product of polymethacrolein) at a temperature preferably of from about 98 to 120° C. for from about 24 to 48 hours. While the above temperature and time of reaction are preferred, a temperature range of from 75 to 150° C. and a reaction time range of from 12 to 72 hours may also be used as reaction conditions, particularly when a longer reaction time is used with a lower reaction temperature.

As before indicated, equal moles of —$NH_2$ of the primary amine and —CHO of the NaCPMA are preferred as the amounts of the two reactants. However, as low as ½ mole and as high as 1½ moles of primary amine can be used per mole of aldehyde of the Cannizzaro polyacrolein reaction product to provide some benefits of the present invention. When less than ½ mole of the primary amine is used, not enough of the aldehyde groups are converted to amine groups to provide the resultant reaction product with improved water thickening or emulsifying properties. On the other hand, use of more than 1½ moles of primary amine is uneconomical and wasteful.

The preferred polyacrolein polymer to be subsequently reacted with a primary amine is one prepared by reacting about .4 to .5 mole of NaOH per mole of methacrolein polymer. The preferred poly-acrolein reaction product to be reacted with a primary amine is also preferably reacted for from about 3 to 12 hours at a temperature of from about 77 to 97° C. to provide polymers with about 15% by weight of the original aldehyde groups unreacted, the remaining aldehyde groups, or about 85% being converted to approximately equal amounts of —$CH_2OH$ and —COOH salt groups. Based on the above described Cannizzaro type methacrolein reaction polymer, there would be from about .15 to .2 mole of —CHO per 100 grams of dry NaCPMA product. Thus on a weight basis, from about 25 to 50 grams of the primary amine is reacted per 100 grams of dry NaCPMA, the NaCPMA being supplied as preferably a 10 to 20% by weight aqueous solution. The preferred NACPMA aqueous solution is one of from about 16 to 17% by weight solids content.

The methacrolein polymers and copolymers which are to be reacted with primary amines according to the present invention can be formed by any recognized polymerization system such as mass polymerization systems, pearl or suspension polymerization systems and emulsion polymerization systems. The suspension and emulsion polymerization systems are preferred because they are easier to work with, and, in addition, the emulsion system can lead to polymers with higher molecular weight than those formed by the mass or suspension systems.

Substantial benefits are obtained in accordance with the present invention when the molecular weight of the polymethacrolein starting material is as low as 500, but for most purposes it is desirable that the average molecular weight be around 1000 up to 5000 or more.

The following example illustrates a suitable preparation of a polymethacrolein polymer.

EXAMPLE I

The following ingredients were placed in a closed vessel and subjected to agitation.

| | Parts |
|---|---|
| Water | 300 |
| Methacrolein | 100 |
| Persulfate initiator | .3 |
| Dupanol C emulsifier | 4.0 |

The pH of the recipe was adjusted to approximately 3.5 with acetic acid and the temperature was kept at approximately 50° C. At the end of 12 hours, the reaction proceeded to approximately 95 percent completion and a polymethacrolein latex was formed having about 25 percent solids. The yields was about 95 parts of polymethacrolein.

The persulfate initiator is added to speed up the reaction. Other initiators, such as hydrogen peroxide and benzoyl peroxide, capable of oxidizing or providing free radicals are also satisfactory. Air alone will initiate the reaction, but it gives a very slow reaction in comparison to reactions employing conventional initiators.

In order to prepare the polymethacrolein reaction product for subsequent reaction with a primary amine, an aqueous dispersion (including suspensions and emulsions) of polymethacrolein, for example, such as that prepared in Example I above, is subjected to a base having a dissociation constant greater than $1.8 \times 10^{-5}$, or a base having a dissociation constant greater than that of ammonium hydroxide at 25° C. Preferable bases are hydroxides and basic salts of the substantially water soluble alkali metals, sodium, potassium and lithium. However, any other basic substance having a dissociation constant greater than ammonium hydroxide may be used. Strong organic bases such as di-isobutyl amine, di-isopropyl amine and other secondary or tertiary alkyl amines, preferably having less than six aliphatic carbon atoms, and certain of the imines, such as piperidine, also bring about the desired reaction. The pH of the reaction mixture (base plus polymethacrolein polymer) should be above 8 and preferably around 11 or above.

The reaction apparently reduces part (usually from 20 to 45 or even almost up to 50%) of the aldehyde groups of the methacrolein polymer or copolymer to hydroxyl to form an alcohol and oxidizes another equivalent part to carboxyl groups, which in turn react with the base to form the corresponding salt. The reaction is similar to the so-called Cannizzaro reaction. One mole of base is theoretically added for each two moles of methacrolein in the polymer. From 35 to 40 percent up to 50 to 60 percent of the theoretical amount of base is preferably added to the methacrolein polymer to convert from about 81 to 88 percent of the aldehyde groups, and when 100 percent of the theoretical amount of base is added, the actual conversion is found to be around 90 percent of theoretical aldehyde groups present. Generally, as low as .3 mole of base and as high as 1.5 moles can be used per mole of aldehyde. The present conversion depends upon the amount of base employed. For reaction with primary amines according to the present invention, a polymethacrolein polymer is employed in which preferably from 83 to 87% of the aldehyde groups have been converted to hydroxyl and carboxyl salt groups.

The term "methacrolein polymer" is here used generically to include copolymers having substantial methacrolein residues present. Copolymers of methacrolein with one or more diolefinic compounds of less than 8 carbon atoms, including the conjugated diolefines, butadiene, isoprene, chloroprene, cyanoprene, dimethyl butadiene, and/or with a copolymerizable mono-olefinic compound such as styrene, acrylonitrile, methyl isopropenyl ketone, and other available, olefinically-unsaturated, polymerizable organic compounds can also be used and subjected to the process described above to form compounds with similar unusual properties. As the amount of methacrolein in the copolymer is reduced, however, the number of aldehyde groups in the copolymer is reduced and the unusual effects obtained by the reaction become less apparent and less effective. Copolymers and copolymer mixtures can also be used to vary the effect of the methacrolein and obtain the desired degree of disassociation and hydrophilicity.

A methacrolein polymer may also be used herein which is formed by grafting methacrolein to copolymers of a conjugated diolefin having less than 8 carbon atoms such as butadiene and a copolymerizable monovinyl monomer such as styrene, acrylonitrile, methyl isopropenyl ketone or other copolymerizable mono-olefinic compound as listed above. An example of a suitable methacrolein polymer formed as described is a butadiene-methacrolein copolymer having methacrolein grafted thereto and converted to a water soluble polymer by means of the Cannizzaro-like reaction in which the grafted polymer is refluxed with sodium hydroxide.

The structure of the reaction product (to be subsequently reacted with primary amines) consists essentially of recurring units of the formula:

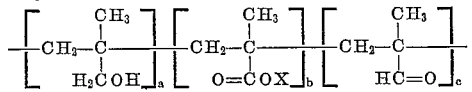

where $a=20$ to $45\%$, $b=20$ to $45\%$, $c=60$ to $10\%$, and $a+b+c=100\%$, and in which X is a cation and preferably an alkali or alkali earth such as Na, K, Li, or Ca although X can be also

in which $R_1$, $R_2$ and $R_3$ are selected from the group consisting of H, alkyl, and aryl-alkyl radicals having less than 6 aliphatic carbon atoms. The reaction product is sometimes hereinafter referred to as a polymethylpropenol-methacrylate salt or a polymethylpropenolmethacrylate. Examples of reaction products contemplated by this reaction are polymethylpropenolsodium methacrylate, polymethylpropenol - potassium methacrylate, polymethyl - propenol - ammonium methacrylate, polymethylpropenol-ethyl phenyl ammonium methacrylate, polymethylpropenol - dimethyl ammonium methacrylate, polymethyl - propenol - trimethyl ammonium methacrylate and the like. Of these, the sodium, lithium and calcium salts are highly preferred for reaction with primary amines.

The following example illustrates the reaction of a strong base and a polymer of methacrolein:

EXAMPLE II

The latex of Example I was diluted with distilled water to form a latex having approximately 10 percent solids. 500 grams of this latex representing about 50 grams dry weight polymethacrolein were added to an autoclave together with 15 grams of sodium hydroxide in solution. The pH of the resultant mixture was around 12 and the mixture was thoroughly stirred up. After the temperature had been raised to around 90° C., an exothermic reaction commenced and the latex gradually changed to a milky paste and became less viscous. As the reaction was completed, the mixture formed a very light yellow solution. The major portion of the reaction was completed in approximately two hours and at the end of 3 hours the solution was placed in a vacuum pan and dried. The product yield was 46.3 grams of polymethylpropenol-sodium methacrylate.

The acid number of free acid of the product was 230 and the product consisted essentially of recurring units of the following structure:

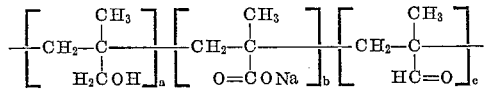

where $a=20$ to $45\%$, $b=20$ to $45\%$, $c=60$ to $10\%$, and $a+b+c=100\%$.

In the above example, the latex was diluted to around 10 percent solids to reduce the thickness and viscosity of the resultant product and to facilitate temperature control. The temperature should be above 80° C. and preferably around 90° C. Since the reaction is exothermic, the reacting mass should preferably be cooled after the reaction has commenced.

Copolymers of methacrolein with other monomers are subject to the same reaction and can be employed to form similar compounds. In order to obtain water soluble products, however, the methacrolein monomer should preferably form from 70 to 75 or more percent by weight of the copolymer. Monomers forming copolymers with methacrolein are aryl-vinyl compounds such as styrene, alpha methyl styrene, and vinyl toluene, conjugated diolefinic compounds having less than eight aliphatic carbon atoms such as butadiene, chloroprene, isoprene, unsaturated aliphatic nitriles such as acrylonitrile and methacrylonitrile, and unsaturated aliphatic ketones such as methyl isopropenyl ketone and methyl vinyl ketone.

We can also obtain water soluble products by using mixtures of the methacrolein homopolymer and/or one or more methacrolein copolymers in which mixtures, the methacrolein (residue from polymerization of methacrolein) comprises from 70 to 75 percent or more of the total weight of the mixture.

In accordance with our invention, copolymers and copolymer mixtures containing methacrolein may be compounded and subjected to the Cannizzaro type reaction to produce copolymers as desired for specific purposes. For instance, if a copolymer with some rubbery characteristics is desired, butadiene is employed in the copolymer. In certain cases where the copolymerization of methacrolein with another monomer does not lead to an alternating or random type polymerization, it is possible to obtain copolymers which will undergo the Cannizzaro type reactions; but, instead of yielding water soluble products, they yield products which are swollen by water. It is also possible to obtain such products by conditioning the reaction on copolymers containing less than 70 percent methacrolein.

The following example illustrates the preparation of a primary amine adduct of a Cannizzaro type polymethacrolein reaction product.

EXAMPLE III

A series of primary amine adducts of a NaCPMA polymer were prepared by mixing and heating a 16.85% aqueous solution of NaCPMA (having about 15% of its original aldehyde groups unreacted) at 98 to 120° C. for from 24 to 48 hours with primary amines as indicated in Table I. In Table I, the grams of primary amine used are set forth based on 100 grams of dry NaCPMA product, the amounts being generally equivalent to about one mole of primary amine per mole of aldehyde in the NaCPMA polymer.

*Table I*

NaCPMA—IMINE SYNTHESES

| Amine | Grams Used/100 Grams of Dry NaCPMA | | | | | | | | |
|---|---|---|---|---|---|---|---|---|---|
| | A | B | C | D | E | W | X | Y | Z |
| Armeen, 10D | 28.5 | | | | | | | | |
| Armeen, 12D | | 33.5 | | | | | | | |
| Armeen, 14D | | | 39 | | | | | | |
| Armeen, 16D | | | | 43 | | | | | |
| Armeen, 18D | | | | | 48.2 | | | | |
| Menthane Diamine | | | | | | 4.68 | | | |
| Primene 81-R | | | | | | | 32.9 | | |
| Primene JM-T | | | | | | | | 38.2 | |
| t-Octylamine | | | | | | | | | 22.2 |
| Amine/—CHO | 1 | 1 | 1 | 1 | 1 | 0.2 | 1 | 1 | 1 |
| Hrs. at 125–130° C | 24 | 24 | 88 | 88 | 88 | 64 | 120 | 120 | 120 |

Visual observation of the above reaction mixture revealed little or no change in viscosity of mixtures W, X, Y and Z, the respective amines used apparently not being reactive. Each of the other amines however, see A through E, converted the fluid Cannizzaro polymethacrolein reaction product to a solid or highly viscous mass.

The composition of the amines shown in Table I are presented in Table II. As seen in Table II the amines used are mixtures of certain long chain alkyl primary amines, such as the highly preferred Armeen 10D primary amine which is a mixture of approximately 90% by weight n-decyl amine, 6% by weight n-dodecyl amine and 4% by weight n-octyl amine.

*Table II*

COMPOSITION OF AMINES USED IN TABLE I

| n-Alkyl amine | 10D | 12D | 14D | 16D | 18D |
|---|---|---|---|---|---|
| Octyl | 4 | | | | |
| Decyl | 90 | 2 | | | |
| Dodecyl | 6 | 95 | 4 | | |
| Tetradecyl | | 3 | 92 | | |
| Hexadecyl | | | 3 | 92 | 6 |
| Octadecyl | | | | 7 | 90 |
| Octadecenyl | | | | 1 | 4 |
| Combining weight | 166 | 195 | 227 | 250 | 280 |

Primene 81R is a mixture of $C_{11}$–$C_{14}$ tertiary-alkyl primary amines having a combining weight of 191.

Primene JM–T is a mixture of $C_{18}$–$C_{22}$ tertiary-alkyl primary amines having a combining weight of 315.

In Table I the "Armeen" amines are products of Armour Chemical; the "Primene" amines are products of Rohm & Haas.

Using the NaCPMA-Imine reaction products prepared as described above as emulsifying agents, a series of emulsions of benzene in water were prepared by mild manual mixing using a concentration generally of about 1% by weight of the reaction product based on the weight of water. The results are shown in Table III.

*Table III*

EMULSIFICATION OF BENZENE BY NaCPMA-IMINES

| Water (parts by weight) | 75 | 70 | 65 | 60 | 55 | 50 |
|---|---|---|---|---|---|---|
| Benzene | 25 | 30 | 35 | 40 | 45 | 50 |

| Amine Adduct | Principal Amine Used | | | | | | |
|---|---|---|---|---|---|---|---|
| A | Octyl Amine | E[1] | E[1] | None | | | |
| B | Decyl Amine | E | None | None | None | | |
| C | Dodecyl Amine | E | E | None | None | | |
| D | Hexadecyl Amine | E | E[2] | | E | None | |
| E | Octadecyl Amine | E | E[2] | | E | None | None |
| | NaCPMA (control) | None | | | | | |

[1] Questionable because of thixotropy.
[2] Concentration, 0.25%.
E. Emulsions were formed by mild manual mixing. The concentration in all cases except "A" was 1% based on weight of water. Concentration of "A" was 0.5%.

As seen in Table III, the emulsifying properties of NaCPMA-imine reaction products D and E are outstanding. As seen in Table II the primary amine mixture used to make composition D contains about 92% by weight n-hexadecyl amine, while the amine used to prepare composition E contains about 90% by weight of n-octadecyl amine. Again as seen in Table III, some emulsification was accomplished using the NaCPMA-imine reaction products A and B (made from octyl and decyl primary amines respectively), but by far the best emulsifying action was obtained by reaction products D and E.

EXAMPLE IV

A series of addition products of a NaCPMA product having about .17 mole of aldehyde per 100 grams dry NaCPMA were prepared by reacting the NaCPMA with enough primary amine so that the molar ratio of amine to aldehyde was generally about 1 to 1. The resultant primary amine adducts were examined for water thickening ability. In more detail, the mono-amine adducts of NaCPMA were prepared by heating a 16.42% aqueous solution of NaCPMA at from 98 to 120° C. for from 24 to 48 hours. The NaCPMA polymer had a molecular weight of above 2000 and about 85% of the original aldehyde groups of the polymethacrolein had been converted to hydroxyl and carboxyl salt groups. The primary amines used and the ratio of the amine in the primary amine reactants to the aldehyde in the NaCPMA are given in Table IV along with dilute solution viscosity data. The viscosity of the dilute 1% aqueous solutions of the resultant mono-amine adducts of polymethyl propenol-sodium methacrylate was determined using a Brookfield viscometer with the No. 1 spindle rotating at 30 revolutions per minute.

*Table IV*

AMINE-ADDUCTS OF NaCPMA

| Experiment No. | Amine | Moles CHO per 100 gm. NaCPMA | Amino —CHO | Brookfield [1] Viscosity of 1% sol'n | Turbidity of 1% Solution |
|---|---|---|---|---|---|
| G | Polyglycolamine | .1721 | 1 | 6 | None. |
| H | n-Butylamine | .1721 | 1 | 3 | Do. |
| I | Armeen 10TD (n-decylamine) | .1721 | 1 | [2] 180* | Do. |
| J | Armeen HTD (Mixture of $C_{16}$ and $C_{18}$ mono primary Amines) | .1721 | 1 | 8 | Slight. |
| K | Armeen 10TD | .2964 | 1 | [2] 24* | Do. |
| L | Armeen HTD | .1721 | 0.59 | 8 | Do. |
| M | None (control) | .1721 | | 6 | None. |

[1] No. 1 spindle, 30 r.p.m.
[2] Concentration, 0.5%.

It can be seen in Table IV that the water thickening ability of amine adducts of NaCPMA marked I and K are outstanding. The Brookfield viscosity data in Table IV clearly indicates that amines such as butyl amine and the amine mixture of $C_{16}$–$C_{18}$ alkyl primary amines do not improve the water thickening ability of Cannizzaro reaction products of alkyl alpha substituted acrolein polymers. As seen in Table IV, the water thickening properties of amine adducts marked "I" are much greater than that of M, which is the unmodified NaCPMA polymer from which the reaction product "I" was prepared.

As indicated in Table IV the amine aldehyde ratio of adduct L was less than 1 to 1. The preparation of reaction product L was designed so that the total number of methylene and methyl groups contributed by the primary amine, Armeen HTD (a mixture of $C_{16}$ and $C_{18}$ primary amines), would equal that contributed by the n-decyl amine used to prepare reaction product I of Table IV. The preparation of reaction product K was designed so that the methylene and methyl group content distributed by decyl amine was increased to match that obtained by Armeen HTD in the reaction product J. However, this latter condition required a reduction in the degree of the Cannizzaro reaction of the NaCPMA polymer and consequently the number of water solubilizing groups was reduced. The NaCPMA polymer used had approximately 25.8% of its aldehyde groups unreacted. Using the NaCPMA amine adducts of Table IV, the viscoity of some of the adducts was measured at various rates of shear as seen in Tables V and VI.

*Table V*

BROOKFIELD VISCOSITY [5] OF NaCPMA-AMINE ADDUCTS AT VARIOUS RATES OF SHEAR

| Sample No. | Conc., Percent | Spindle No. | Spindle, r.p.m. | | | |
|---|---|---|---|---|---|---|
| | | | 6 | 12 | 30 | 60 |
| I | 0.5 | 1 | 450 | 300 | 180 | 98 |
| | 0.5 | 2 | 620 | 450 | 260 | 190 |
| | 0.5 | 3 | 800 | 550 | 340 | 210 |
| | 0.5 | 4 | [1] (100,000) | 900 | 400 | 300 |
| K | 1.0 | 1 | [1] (1,000) | [1] (500) | [1] (200) | [1] (100) |
| | 1.0 | 2 | 3,330 | 2,000 | [1] (1,000) | [1] (500) |
| | 1.0 | 3 | 3,800 | 2,300 | 1,800 | 680 |
| | 1.0 | 4 | 5,000 | 3,000 | 2,400 | 850 |
| I | 0.5 | 3 | | | | [2] 210 |
| | 1.0 | 3 | | | | [3] 700 |
| | 1.44 | 3 | | | | [4] 1,420 |

[1] Maximum viscosity reading for the instrument at the specific conditions of spindle size and speed.
[2] Reading taken after 5-10 min. (Equilibrium time.)
[3] Reading taken after 15-20 min. (Equilibrium time.)
[4] Reading taken after 25-30 min. (Equilibrium time.)
[5] Viscosity in centipoises.

*Table VI*

EFFECT OF SHEAR TIME ON BROOKFIELD VISCOSITY OF NaCPMA-DECYLAMINE ADDUCT (I)

| Time, min.: | Vis. Centipoises [1] |
|---|---|
| 1 | 1,800 |
| 1 | 1,080 |
| 2 | 820 |
| 3 | 800 |
| 4 | 800 |
| 5 | 740 |
| 7 | 820 |
| 8 | 760 |
| 13 | 740 |
| 15 | 740 |

[1] Brookfield viscometer #3 spindle 60 r.p.m.

Accurate viscosity data was difficult to obtain on the NaCPMA-decyl amine adduct because of thixotropy of the material. The gel structure apparently is rapid and in less than 30 seconds the original viscosity is rapidly approached.

As noted in Table V, the remarkable increase in water thickening ability was obtained only by the use of a primary decyl amine and a similar effect was not obtained when a n-butyl amine or an amine mixture of hexadecyl and octadecyl amine was used. As also noted in Table V, the NaCPMA polymer used preferably has at least about 75% by weight of its aldehyde group converted to hydroxyl and carboxyl salt groups since the slightly turbid solution obtained using the reaction product K (see Table IV) indicates decreased water solubility. Also the water thickening ability of K, while good, was still decreased over that of reaction product I.

While the mono-primary amines having hydrocarbon radicals of from 8 to 12 carbon atoms are excellent water thickening agents, some additional thickening ability can be obtained by crosslinking the NaCPMA polymer/primary amine adducts with diamines such as tetraethylene pentamine, diethylene diamine and ethylene diamine having 2 terminal —$NH_2$ groups and a relatively straight chain between the terminal amine groups composed of divalent alkylene groups of from 1 to 3 carbon atoms and >NH groups and where the total chain length between the terminal amine groups is from about 2 to 18 carbon atoms. The above diamines preferably have —NH— groups interposed between the alkylene groups which are located in the chain between the terminal primary amine groups. Generally the viscosity of the adducts can be increased by reaction with from about .1 to .75 part by weight of diamine per 100 parts by weight of NaCPMA or primary amine adducts of NaCPMA.

The concentration of the primary amine adducts of the present invention when used as thickening agents or emulsifying agents is generally from about .05 to 2% by weight based on the water used to form the solution, although preferably for emulsion purposes the concentration is from about .1 to 1% by weight and for water thickening the concentration is preferably from .5 to 1.5% by weight.

The primary amine adducts of the NaCPMA or other Cannizzaro reaction product of alkyl alpha substituted acrolein polymers are useful as fluid loss control agents in drilling muds and in water base paints as thickeners.

EXAMPLE V

Two primary amine adducts were prepared by reacting the same NaCPMA polymer used in Example III with a primary amine mixture A which is a mixture of octyl, decyl and dodecyl amine (89-93% primary amine derived from coconut oil) and also a primary amine mixture B which is a mixture of octyl, decyl and dodecyl amines having from 97 to 99% primary amines the latter amine being more purified from the former by distillation. The two imine reaction products were made by charging 1 mole of amine for 1 mole of aldehyde and reacting the mixture by heating at 130° C. for 96 hours. The resultant NaCPMA amine reaction products were compared as water thickeners at low concentration with a NaCPMA/imine reaction product made with a primary amine comprising a mixture of 95% dodecyl, 3% tetradecyl and 2% decyl amines (see NaCPMA-imine reaction product B of Table I). The results are shown in Table VII.

*Table VII*

BROOKFIELD VISCOSITY OF NaCPMA-IMINES

| Percent Concentration | Brookfield Viscosity (Centipoises) | | | | | | | |
|---|---|---|---|---|---|---|---|---|
| | 0.112 | 0.121 | 0.225 | 0.243 | 0.45 | 0.487 | 0.9 | 0.97 |
| Material B (Table I) | 22 | | 130 | | 600 | | 3,200 | |
| Amine Mixture A, Alamine 21 (89-90% primary amine) | | 15 | | 67 | | 600 | | 3,000 |
| Amine Mixture B, Alamine 21D (97-99% primary amine) | | 22 | | 82 | | 600 | | 2,000 |

In the above table, the primary amine content of amine mixture A ("Alamine 21") and amine mixture B ("Alamine 21D") is believed to comprise approximately 90% n-decyl amine, 5% n-octyl amine and 5% n-dodecyl amine.

The reaction products prepared by Alamine 21 and 21D are less efficient water thickeners than the reaction product B of Table I. It is noted that the impure primary amine Alamine 21 apparently preform equally well as the relatively pure Alamine 21D.

Water extended reaction products of high molecular weight (4000 or 5000 or more) NaCPMA and amine of Table VII using the same aldehyde and amino ratios were also prepared. These reaction products were extremely viscous and rubbery. The water extended products could not be diluted with water even under high shear and high temperature.

The Cannizzaro and imine reaction products may also be prepared simultaneously, all ingredients being reacted in a single step. Thus the methacrolein latex diluted with a suitable amount of water may be mixed with alkali metal hydroxide sufficient to give 80% or 85% or so aldehyde reaction, and with a primary amine preferably to provide an amine to aldehyde ratio of 1:1 or so. The mixture is then heated at suitable temperature as before set forth to effect the Cannizzaro reaction and then further heated at a higher temperature to effect the imine product formation.

In the above examples, the sodium salt of the polymethacrolein reaction product (polymethyl propenol-sodium methacrylate) may be substituted in whole or part by preferably alkali and/or alkaline earth metal salts of poly-alkylalpha substituted-acrolein reaction products which have the recurring units of the following general formula:

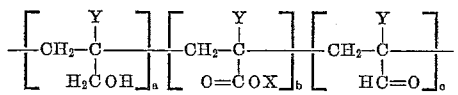

where $a=20$ to 45%, $b=20$ to 45%, $c=60$ to 10%, and $a+b+c=100\%$, X is preferably Na, K, Li and Ca or even a cation having the formula

in which $R_1$, $R_2$ and $R_3$ are selected from a member of the group consiting of hydrogen, alkyl and alkyl-aryl radicals having less than 6 aliphatic carbon atoms. Examples of the above described salts are polymethyl propenol-sodium methacrylate, polyethyl propenol-sodium methacrylate, polymethyl propenol-potassium methacrylate, polymethyl propenol-lithium methacrylate, polyethyl propenol-potassium methacrylate and even ammonium or amine salts including polymethol propenol-ammonium methacrylate, polymethyl propenol-dimethyl ammonium methacrylate, polymethyl propenol-ethyl phenyl ammonium methacrylate, polyethyl propenol-ethyl phenyl ammonium methacrylate, polymethyl propenol-dimethyl ammonium methacrylate, polymethyl propenol-propyl dimethyl ammonium methacrylate, polymethyl propenol-phenyl butyl ammonium methacrylate and polypropyl propenol-diamyl ammonium methacrylate. While any of the above salts can be used, the best results are obtained when X is Na. The polyalkyl substituted acrolein reaction products may be prepared in the same manner as illustrated for polymethylpropenol sodium methacrylate except that alkyl alpha substituted-acrolein polymers such as a polyethacrolein and polypropyl acrolein and other alkyl substituted polymers having the monomer formula

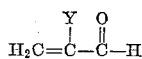

(where Y is an alkyl radical of from 1 to 12 carbon atoms and preferably methyl and ethyl for the best results) may be substituted for all or part of the polymethacrolein starting material.

While this invention has been described with reference to certain specific embodiments, it is to be understood that it is not limited thereto.

What we claim is:

1. A composition of matter comprising the reaction product obtained by reacting in aqueous media at a temperature of from 75 to 150° C. for from 12 to 96 hours (I) at least one mono primary amine having a substantially linear hydrocarbon chain of from 8 to 22 carbon atoms and (II) at least one water soluble polymeric material having a molecular weight of at least 500 and being selected from the group consisting of (1) a homopolymer consisting essentially of recurring units of A and (2) a copolymer consisting essentially of recurring units of at least 70% A and the balance B, where A has the formula

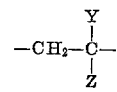

where Y is an alkyl group of from 1 to 12 carbon atoms, where Z comprises from about 20 to 45%

groups, from 20 to 45%

groups and the balance

groups, where X is a cation selected from the group consisting of —Na, —K, —Li and

radicals, where $R_1$, $R_2$ and $R_3$ are selected from the group consisting of H, alkyl and alkyl-aryl radicals having less than six aliphatic carbon atoms, where B is a recurring unit of at least one copolymerized monomer selected from the group consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene, and vinyl toluene, the mole ratio of said amine to said

group being from about 0.5:1 to 1.5:1.

2. A composition of matter according to claim 1 in which said amine is an alkyl amine of from 16 to 20 carbon atoms.

3. A composition of matter according to claim 2 in which Y is methyl and X is sodium.

4. A composition of matter according to claim 1 in which said amine is an alkyl amine of from 8 to 12 carbon atoms.

5. A composition of matter according to claim 4 in which said reaction product of (I) and (II) contains additionally (III) from about 0.1 to 0.75 part by weight based on 100 parts by weight of said water soluble polymeric material of an alkylene diamine.

6. A composition of matter according to claim 5 in which Y is methyl and X is sodium.

7. A composition of matter comprising water and from about 0.05 to 2% by weight based on the weight of said water of the reaction product obtained by reacting in aqueous media at a temperature of from 75 to 150° C. for from 12 to 96 hours (I) at least one mono primary amine having a substantially linear hydrocarbon chain of from 8 to 22 carbon atoms and (II) at least one water soluble polymeric material having a molecular weight of at least 500 and being selected from the group consisting of (1) a homopolymer consisting essentially of recurring units of A and (2) a copolymer consisting essentially of recurring units of at least 70% A and the balance B, where A has the formula

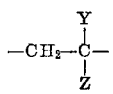

where Y is an alkyl group of from 1 to 12 carbon atoms, where Z comprises from about 20 to 45%

groups, from 20 to 45%

groups and the balance

groups, where X is a cation selected from the group consisting of —Na, —K, —Li and

radicals, where $R_1$, $R_2$, and $R_3$ are selected from the group consisting of H, alkyl and alkyl-aryl radicals having less than six aliphatic carbon atoms, where B is a recurring unit of at least one copolymerized monomer selected from the group consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene, and vinyl toluene, the mole ratio of said amine to said

group being from about 0.5:1 to 1.5:1.

8. A composition of matter according to claim 7 containing additionally a water immiscible aromatic hydrocarbon solvent.

9. A composition of matter comprising the reaction product obtained by reacting in aqueous media at a temperature of from 75 to 150° C. for from 12 to 96 hours (I) at least one mono primary amine having a substantially linear hydrocarbon chain of from 8 to 22 carbon atoms, (II) at least one polymeric material having a molecular weight of at least 500 and being selected from the group consisting of a homopolymer of A and a copolymer of at least 70% of A and the balance B, where A has the formula

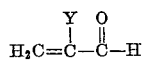

where Y is an alkyl radical of from 1 to 12 carbon atoms and where B is at least one copolymerized monomer selected from the group consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene, and vinyl toluene, and (III) a base having a dissociation constant greater than that of ammonium hydroxide at 25° C., said base being used in an amount sufficient to convert from about 40 to 90% of the theoretical aldehyde groups of said polymeric material to essentially equivalent amounts of

groups and

groups where X is a cation radical of said base, and said primary amine being used in an amount of from about 0.5 to 1.5 moles per mole of the unconverted aldehyde groups of said polymeric material.

10. The method which comprises reacting in aqueous media at a temperature of from 75 to 150° C. for from 12 to 96 hours (I) at least one mono primary amine having a substantially linear hydrocarbon chain of from 8 to 22 carbon atoms and (II) at least one water soluble polymeric material having a molecular weight of at least 500 and being selected from the group consisting of (1) a homopolymer consisting essentially of recurring units of A and (2) a copolymer consisting essentially of recurring units of at least 70% A and the balance B, where A has the formula

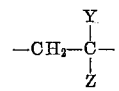

where Y is an alkyl group of from 1 to 12 carbon atoms, where Z comprises from about 20 to 45%

groups, from 20 to 45%

groups and the balance

groups, where X is a cation selected from the group consisting of —Na, —K, —Li and

radicals, where $R_1$, $R_2$, and $R_3$ are selected from the group consisting of H, alkyl and alkyl-aryl radicals having less than six aliphatic carbon atoms, where B is a recurring unit of at least one copolymerized monomer selected from the group consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene, and vinyl toluene, the mole ratio of said amine to said

group being from about 0.5:1 to 1.5:1.

11. The method according to claim 10 in which said amine is an alkyl amine of from 16 to 20 carbon atoms.

12. The method according to claim 11 in which Y is methyl, and X is sodium.

13. The method according to claim 10 in which said amine is an alkyl amine of from 8 to 12 carbon atoms.

14. The method according to claim 13 in which there is additionally reacted with (I) and (II) from about 0.1 to 0.75 part by weight based on 100 parts by weight of said water soluble polymeric material of an alkylene diamine.

15. The method according to claim 14 wherein Y is methyl, and X is sodium.

16. The method which comprises mixing together water and from about 0.05 to 2.0% by weight based on the weight of said water of the reaction product obtained by reacting in aqueous mediaq at a temperature of from 75 to 150° C. for from 12 to 96 hours (I) at least one mono primary amine having a substantially linear hydrocarbon chain of from 8 to 22 carbon atoms and (II) at least one water soluble polymeric material having a molecular weight of at least 500 and being selected from the group consisting of (1) a homopolymer consisting essentially of recurring units of A and (2) a copolymer consisting essentially of recurring units of at least 70% A and the balance B, where A has the formula

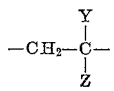

where Y is an alkyl group of from 1 to 12 carbon atoms, where Z comprises from about 20 to 45%

groups, from 20 to 45%

groups and the balance

groups, where X is a cation selected from the group consisting of —Na, —K, —Li and

radicals, where $R_1$, $R_2$, and $R_3$ are selected from the group consisting of H, alkyl and alkyl-aryl radicals having less than six aliphatic carbon atoms, where B is a recurring unit of at least one copolymerized monomer selected from the group consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene, and vinyl toluene, the mole ratio of said amine to said

group being from about 0.5:1 to 1.5:1.

17. The method according to claim 16 in which there is additionally mixed with said water and said reaction product a water immiscible aromatic hydrocarbon solvent.

18. The method which comprises reacting in aqueous media at a temperature of from 75 to 150° C. for from 12 to 96 hours (I) at least one mono primary amine having a substantially linear hydrocarbon chain of from 8 to 22 carbon atoms, (II) at least one polymeric material having a molecular weight of at least 500 and being selected from the group consisting of (1) a homopolymer of A and (2) a copolymer of at least 70% of A and the balance B, where A has the formula

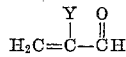

where Y is an alkyl radical of from 1 to 12 carbon atoms and where B is at least one copolymerized monomer selected from the group consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene, and vinyl toluene, and (III) a base having a dissociation constant greater than that of ammonium hydroxide at 25° C., said base being used in an amount sufficient to convert from about 40 to 90% of the theoretical aldehyde groups of said polymeric material to essentially equivalent amounts of

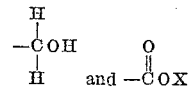

groups where X is a cation radical of said base, and said primary amine being used in an amount of from about 0.5 to 1.5 moles per mole of the unconverted aldehyde groups of said polymeric material.

19. The method which comprises reacting, in aqueous media at a temperature of from 75 to 150° C. for from 12 to 96 hours, (I) at least one mono primary amine having a substantially linear hydrocarbon chain of from 8 to 22 carbon atoms and (II) at least one water soluble polymeric material having a molecular weight of at least 500 and being selected from the group consisting of (1) a homopolymer consisting essentially of recurring units of A and (2) a copolymer consisting essentially of recurring units of at least 70% of A and the balance B, where A has the formula $$-CH_2-\underset{Z}{\underset{|}{\overset{Y}{\overset{|}{C}}}}-$$

where Y is an alkyl group of from 1 to 12 carbon atoms, where Z comprises from about 20 to 45%

$$-\underset{H}{\underset{|}{\overset{H}{\overset{|}{C}}}}-OH$$

groups, from 20 to 45%

$$-\overset{O}{\overset{\|}{C}}-OX$$

groups and the balance $$-\overset{H}{\overset{|}{C}}=O$$

groups, where X is a cation selected from the group consisting of —Na, —K, —Li and $$-\underset{R_3}{\underset{\diagup}{\overset{H}{\overset{|}{N}}}}-R_1$$
$$\phantom{-N}R_2$$

radicals, where $R_1$, $R_2$ and $R_3$ are selected from the group consisting of H, alkyl and alkyl-aryl radicals having less than 6 aliphatic carbon atoms, where B is a recurring unit of at least one copolymerized monomer selected from the group consisting of butadiene, isoprene, cyanoprene, dimethyl butadiene, chloroprene, styrene, acrylonitrile, methacrylonitrile, methyl isopropenyl ketone, methyl vinyl ketone, alpha methyl styrene, and vinyl toluene, the mole ratio of said amine to said $$-\overset{H}{\overset{|}{C}}=O$$

group being from about 0.5:1 to 1.5:1, and said polymeric material being present in said aqueous media in an amount of from about 10 to 20% by weight of solids based on the amount of water in said aqueous media.

References Cited in the file of this patent
FOREIGN PATENTS

| | | |
|---|---|---|
| 803,053 | Great Britain | Oct. 15, 1958 |
| 505,507 | Canada | Aug. 31, 1954 |
| 532,040 | Canada | Oct. 23, 1956 |